United States Patent Office 3,420,862
Patented Jan. 7, 1969

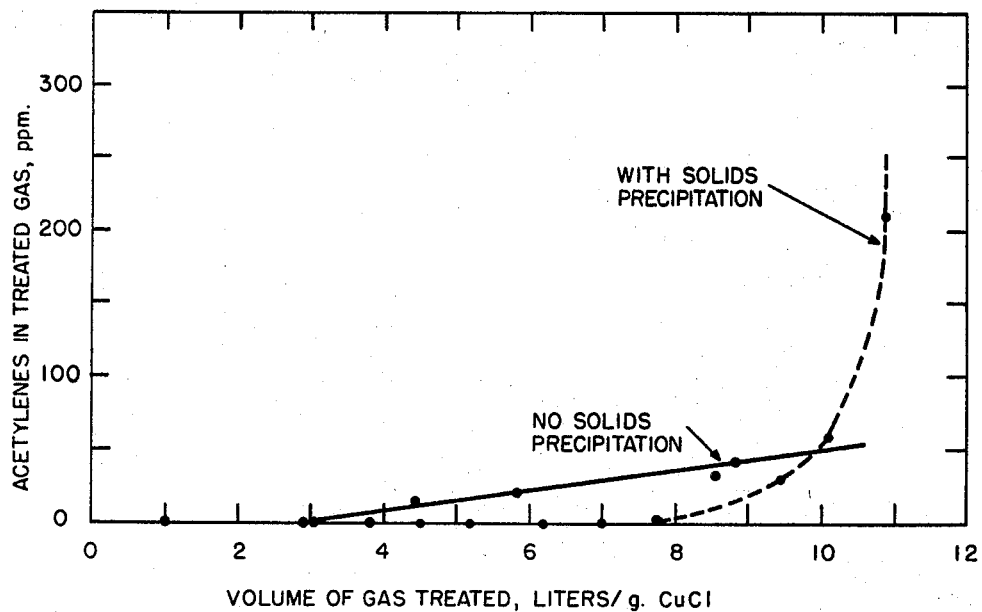
EFFECT OF SOLIDS PRECIPITATION ON ACETYLENE REMOVAL FROM CRUDE $C_4^=$
Robert B. Long     Inventor
By *Frank A. Simmok*
Patent Attorney

3,420,862
COMPLEXES OF COPPER COMPOUNDS WITH ACETYLIDES
Robert B. Long, Monmouth, N.J., assignor to Esso Research and Engineering Company, a corporation of Delaware
Filed Jan. 4, 1965, Ser. No. 423,227
U.S. Cl. 260—438.1                 8 Claims
Int. Cl. C07f 1/08; C07c 7/16

ABSTRACT OF THE DISCLOSURE

Acetylenes are removed from acetylene containing streams by contacting said streams with a cuprous halide or other cuprous salt, said salt dissolved in a basic solvent having appreciable solubility for the cuprous salt but less than about 1% solubility for the complexed acetylides.

---

The present invention relates to a highly economic process for selectively and completely removing and recovering acetylenes from a gas or liquid stream containing also other highly reactive materials. The present process may be used to purify streams of minor amounts of acetylenes or to recover pure acetylenes from more concentrated streams or to both purify streams of acetylenes and to recover pure acetylenes. The present invention also relates to new complexes of copper compounds with acetylides useful as chemical intermediates and catalysts for a variety of purposes e.g. Reppe reactions such as ethinylation, etc.

The present process represents a major step forward over prior art process both (1) as to its ability to completely remove acetylenes to a level of below 50 p.p.m. e.g. <10 p.p.m. by short residence time contacting with a small volume of treating solution and (2) as to its ability to recover the said acetylenes in essentially pure form e.g. above 95% purity, thereby in purification processes minimizing loss of desired product and in acetylene recovery processes giving a pure acetylene product.

The present process operates by means of the following equation:

6CuY (dissolved in critical solvent) + 2H—C≡C—R $\underset{110° C.}{\overset{25\text{-}35°C.}{\rightleftarrows}}$

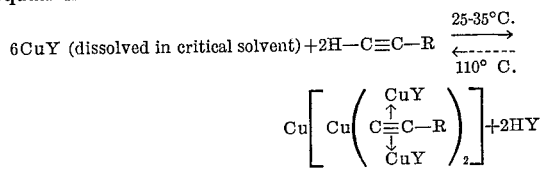

+2HY where:

(1) CuY is a cuprous halide or cuprous salt of a $C_1$–$C_4$ organic acid or less preferably cuprous hydroxide and
(2) R is hydrogen or an organic radical preferably an H, alkyl or alkenyl group, e.g. a $C_1$ to $C_{11}$ or $C_1$ to $C_7$, or $C_1$ to $C_4$ alkyl or alkenyl group.

Thus, the solvent and reaction conditions are chosen such that the complexed complex cuprous acetylide, a non-explosive solid, is substantially insoluble in the solvent and continuously precipitates during the treating step, thus providing the strong driving force for the reaction. In a preferred embodiment the precipitated solids are separated and stripped of unreacted materials i.e. primarily materials other than acetylenes and the solids heated to release the acetylenes and recover the cuprous salt for recycle to the process. Alternatively, in another preferred embodiment the precipitated solids and solvent mixture is stripped and heated to release the acetylenes and recover the cuprous salt solvent solution for reuse.

The new composition of matter complexed complex acetylides of this invention are characterized as follows (specific samples tested prepared using dimethyl sulfoxide as the critical solvent):

| Cuprous Chloride | Ethyl Acetylene | Mixed $C_3$ and $C_4$ Acetylenes | Vinyl Acetylene | Methyl Acetylene |
|---|---|---|---|---|
| M.P. | >250 | >250 | >270 | >270 | >252 |
| Color | Dark tan | Yellow | Black | Yellow | Yellow-green |
| Elemental Anal., wt. percent: | | | | | |
| C | 18.3 | 15.5 | 12.0 | 21.1 | 12.9 |
| H | 2.4 | 1.7 | 2.8 | 1.8 | 2.1 |
| Cu | 59.6 | 43.9 | 44.0 | 58.1 | 56.5 |
| Cl | 15.6 | 14.0 | 16.4 | 16.2 | 16.7 |
| S | 1.8 | 2.9 | 12.8 | 0.6 | ----- |
| O | 1.9 | 5.6 | 7.7 | 0.9 | 3.4 |
| Hot Plate Ignition Test | (1) | (1) | (1) | (1) | (1) |
| Shock Sensitivity Test | (2) | (2) | (2) | (3) | (3) |
| Cuprous Acetate | ----- | Yellow-green | ----- | ----- | ----- |

[1] Ignites and burns (stable flame unlike explosive burning obtained with simple copper acetylides).
[2] Insensitive.
[3] Not tested.

It should be noted that the elemental analysis for vinyl acetylene to cuprous salt is 4:1 rather than the 3:1 shown by the formula given above. Thus, as expected, an additional molecule of cuprous salt complexes with the extra unsaturation in vinyl acetylene. This is true of any alkylene group being present in the formula.

X-ray diffraction powder patterns were run on the various complexed acetylides prepared from the pure acetylenes. These patterns when compared with the patterns of the solids from purifying crude butadiene showed that the complexed acetylides from crude butadiene are not simple mixtures of the homogeneous pure complexed acetylides. That is, one complexed acetylide molecule can contain two different acetylide radicals in the same molecule. Thus, in the formula given above for the new complexed complex acetylides each R may be the same or different, i.e., the formula can be written:

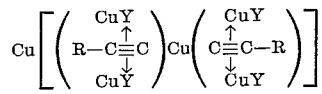

This means that about 6 different complexed acetylides can exist in the solids prepared from crude butadiene because there are three acetylenes in crude butadiene. The X-ray spectra of the pure complexed acetylides show the typical strong lines in the neighborhood of 8 to 11 A. which are characteristic of the complexed molecules, i.e. large and bulky rather than e.g. simple acetylides.

Infrared spectra of KBr pellets of the complexed acetylides were obtained as follows (major bands given in microns where (s) stands for strong bands and (w) stands for weak bands)

| Acetylene | Methyl Acetylene | Ethyl Acetylene | Vinyl Acetylene | Mixed $C^3$ and $C^4$ Acetylene |
|---|---|---|---|---|
| 2.95 (s) | 2.90 (s) | 2.90 (s) | 2.94 (s) | 2.90 (s) |
| 3.00 (s) | 2.95 (s) | 3.34 | 3.00 (s) | 3.35 |
| 6.15 | 3.32 (w) | 3.40 | 3.31 (w) | 3.40 |
| 6.96 | 3.40 (w) | 5.35 (w) | 3.35 (w) | 5.16 (w) |
| 7.10 | 6.10 | 5.44 (w) | 3.40 (w) | 5.40 |
| 7.63 | 6.90 | 6.15 | 5.41 | 6.15 |
| 7.80 | 7.03 | 6.82 | 6.15 | 6.27 |
| 8.75 | 7.37 (w) | 6.86 | 6.25 | 6.37 |
| 9.65 (s) | 7.60 (w) | 6.95 | 6.97 (w) | 6.84 |
| 10.50 (s) | 7.80 | 7.07 (w) | 7.14 | 6.87 |
| 11.13 (w) | 8.73 | 7.25 | 7.80 (w) | 7.00 |
| 11.80 (w) | 9.72 (s) | 7.69 | 9.27 (w) | 7.12 |
| 13.00 (w) | 9.93 | 8.02 (w) | 9.80 (w) | 7.25 (w) |
| 14.10 (w) | 10.50 | 8.75 (w) | 10.35 (s) | 7.68 (w) |
| | 10.88 (w) | 9.20 | 10.75 (s) | 7.80 (w) |
| | 11.12 (w) | 9.37 | 10.90 (s) | 8.03 (w) |
| | 11.75 (w) | 9.75 (s) | 11.80 (w) | 9.20 |
| | 13.00 (w) | 10.50 | 14.95 | 9.37 (w) |
| | 14.05 (w) | 11.77 (w) | | 9.80 (w) |
| | | 12.80 | | 10.34 (s) |
| | | 14.10 (w) | | 10.93 (s) |
| | | | | 12.80 |
| | | | | 15.05 |

Samples of the new complexed complex acetylides were also prepared using amine solvents as follows:

| | Ethylene Triamine | Diethylene Triamine |
|---|---|---|
| Analysis of Solids, wt. percent:[1] | | |
| Carbon | 23.55 | 30.58 |
| Hydrogen | 5.24 | 4.93 |
| Nitrogen | 22.56 | 20.28 |
| Oxygen | 0.67 | 1.36 |
| Copper | 26.6 | 18.1 |
| Chlorine | 16.3 | 12.1 |

[1] Mixed $C_3$ and $C_4$ acetylene from crude butadiene.

The solids analysis corresponds to two solvent molecules per CuCl, in both cases with a residual copper content of 4 copper for 1 acetylenes with ethylene diamine and 3.5 copper for 1 acetylenes for diethylene triamine. Residual chlorine in the solvents amounts to 0.7 chlorines per acetylene for ethylene diamine and 0.6 chlorines per acetylene for diethylene triamine. The copper to acetylene ratios correspond to what would be expected for complexed complex acetylides. Thus, the complexed complex acetylides are probably coprecipitated with the simple amine cuprous chloride complex, e.g., via cocrystallization.

The new composition of matter complexed complex acetylides are further understood by analogy to the potassium copper complex acetylides described by R. Nast in an article entitled "Complex Acetylides of Transition Metals," in Coord. Chem., pp. 103–112 (1959). Thus, conventional explosive simple acetylides, R. Nast complex acetylides, and the present complexed complex acetylides are represented as follows:

Simple acetylide:

$$Cu-C\equiv C-R$$

(Explosive)

Complex acetylides (analogous to R. Nast acetylides where Cu outside the brackets is K):

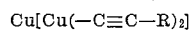

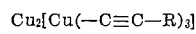

(Probably non-explosive)

Complexed complex acetylides:

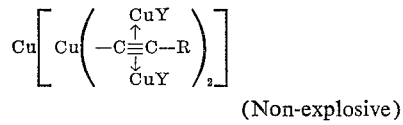

(Non-explosive)

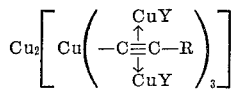

It is noted that the first complexed complex acetylide formula listed is by analogy to the R. Nast complex acetylides the present new composition of matter. Thus, the present preparation involves only small amounts of acetylides present relative to the cuprous salt. This is similar to the last equation described on page 107 of R. Nast. However, since both formulas have the same stoichiometry, e.g., for

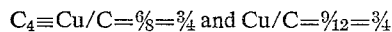

respectively, there is some possibility it is the second formula or a mixture of the two materials.

The critical solvents which may be used are general any organic base (or liquid ammonia) having appreciable solubility for the cuprous salt which does not form an insoluble complex with the copper salt, which does not convert the salt to metallic copper or cupric ion, and most important which has low solubility, i.e., less than 1 wt. percent, more preferably less than 0.1 wt. percent, most preferably less than 0.05 wt. percent for the new complexed complex acetylides described above (to create the strong driving force for the reaction mentioned above). Preferably and also most important the solvent also has relatively high solubility for the simple acetylides, i.e., preferably greater than 0.10 wt. percent, more preferably greater than 1 wt. percent, most preferably greater than 5 wt. percent. Thus, this high solubility provides sufficient dissolved simple acetylides to give rapid formation of the complexed complex acetylides and prevents precipitation of the explosive simple acetylides. It should be noted that it is believed that the complexed complex acetylides are formed only from simple acetylides in solution. Preferably to promote the formation of acetylides the solvent has a pH of 7.5 to 15, preferably 9 to 14. Since addition of certain cuprous salts to certain solvents changes the pH of these solvents it is preferred to utilize a final cuprous salt solution having a pH of 5 to 15, preferably 7 to 14. It is noted that the critical low solubility for the complexed complex acetylides may be obtained also by careful control of reaction conditions, e.g., temperature and by expedients such as addition of antisolvents.

Preferred solvents are as follows:

(1) Sulfoxides, preferably $C_2$ to $C_{14}$, more preferably $C_2$ to $C_6$ branched and straight chain alkyl, aryl and aralkyl sulfoxides, e.g., dimethylsulfoxide, diethylsulfoxide, tetramethylenesulfoxide.

(2) Amines, preferably $C_1$ to $C_{20}$, more preferably $C_2$ to $C_{12}$ branched and straight chain alkyl, aryl and aralkyl amines, e.g., ethylene diamine, diethylenetriamine, diethylamine triethylenetetramine. Where amines are used, the complexed complex acetylide solids also contain cocrystallized amine-cuprous salt complex, about 2 moles of amine per mole of copper.

(3) Amides, preferably $C_1$ to $C_{12}$, more preferably $C_3$ to $C_8$ branched and straight chain alkyl, aryl and aralkyl amides, e.g., N,N'-dimethylformamide, N,N'-diethylformamide, dimethyl acetamide, formamide, N-methyl formamide.

The amount of cuprous salt dissolved in the solvent may be any amount up to a saturated solution or even, less preferably, a supersaturated solution and will, of course, depend upon the solvent used. In general, preferred amounts of copper salt are 1 to 50, preferably 3 to 25 wt. percent based on solvent.

The solvents used in the present invention are preferably used alone, however, they may be used in admixture with other materials so long as the appropriate basicity and solvency of the solution are maintained. Preferably where water is used as an additional material the amount is limited to less than 40%, preferably less than 15%, since it has been found that larger amounts promote the formation of explosive uncomplexed acetylides rather than the new complexed acetylides of this invention. Furthermore, at high water levels, some hydrolysis of CuCl to form HCl which inhibits the acetylene removal reaction may occur. It is noted that some of the streams purified according to the present invention contain a small amount of water. This small amount of water builds up in repetitive cycling of the solvent, however, the amount in many solvents such as dimethylsulfoxide is limited by equilibrium, e.g., to 7.5%. At this level water does not particularly adversely affect the reaction and may be of some benefit in limiting solubility of unreacted feed components.

The appropriate cuprous salt to be dissolved in the solvent may be any cuprous salt so long as appropriate anions are present with the cuprous ions to produce the acetylide complex with the cuprous salt, i.e., in general any cuprous salt capable of complexing with acetylenes, e.g., a cuprous halide; a cuprous salt of a carboxylic acid, preferably a $C_1$ to $C_5$ monocarboxylic acid e.g., cuprous ammonium acetate; less preferably cuprous hydroxide or cuprous cyanide. Preferably the same cuprous salt is dissolved in the solvent as that formed in the complex rather than, e.g., cuprous chloride being dissolved in dimethylsulfoxide containing acetic acid to form the cuprous acetate. It is preferred that the cuprous salt used have a purity of above 90 wt. percent, preferably above 95 wt. percent, most preferably above 98 wt. percent.

The cuprous salt liquid solution is contacted with the acetylene-containing stream at temperatures preferably of 0 to 60° C., preferably 20 to 40° C., e.g., 30° C. With some solvents reaction conditions must be chosen to obtain the required low solubility for the complexed complex acetylides, e.g., temperature, high concentration of cuprous salt, etc. The acetylene-containing stream may be supplied either as a vapor which is bubbled through the cuprous salt containing solution or alternatively liquid-liquid contacting, i.e., mixing followed by settling, e.g., to separate, may be used. Mole ratios of acetylene-containing stream to solution are 0.1 to 10, preferably 0.25 to 4, e.g., 1. Liquid contacting times are 1 minute to 2 hours, preferably 5 minutes to 40 minutes, e.g., 15 minutes. Vapor contacting times are 1 to 300 seconds, preferably 5 to 100 seconds, e.g., 30 seconds. Pressures may be any suitable pressure from superatmospheric to subatmospheric pressure, preferably 10 to 200 p.s.i.a.

Preferably a proton acceptor stronger than the solvent itself is present in the solvent mixture or may be added with the acetylene-containing stream supplied to remove the protons released in the formation of the acetylides. Preferred proton acceptors are ionic bases, preferably NaOH, KOH, or $NH_4OH$, ammonia, amines, preferably $C_1$ to $C_{20}$, more preferably $C_4$ to $C_{12}$ branched or straight chain, alkyl, aryl and aralkyl amines, e.g., ethylene diamine. The amount of proton acceptor present in the solvent is preferably 0.1 to 25, more preferably 1 to 15 mole percent proton acceptor based on solvent.

Following contacting which may or may not include precipitation of solid complexed complex acetylides from the solution, the solution containing a slurry of the complexed acetylides or the complexed acetylides separated from the solution are stripped to remove nonacetylene materials present in the stream and the material is regenerated to spring the acetylenes by heating plus preferably adding a proton donor such as HCl, acetic acid, ammonium ion, or water to free the acetylene. Suitable temperatures are 75 to 150° C., preferably 90 to 125° C. and holding at this temperature for 1 to 200, preferably 10 to 60 minutes. The amount of proton donor to be added is preferably 0 to 1 equivalent, more preferably 0.1 to 0.3 equivalent per equivalent of cuprous salt in the contacting solution.

Preferred proton donors are preferably the corresponding acids of the cuprous salts used such as HCl, water, and $C_1$ to $C_8$, more preferably $C_2$ to $C_4$ branched and straight chain alkyl, aryl and aralkyl organic acids, e.g., acetic acid, formic acid, propionic acid, etc.

Example 1

Varying amounts of the cuprous salt were dissolved, e.g., 15 g. of Bower Chemical Mfg. Company reagent grade cuprous chloride was dissolved in 160 cc. of dimethylsulfoxide (DMSO) at room temperature, i.e., 24° C. In addition to the solvent in some cases a proton acceptor, e.g., ammonia, sodium hydroxide, etc. was added. The use of a proton acceptor gave uniform results indicating that in the absence of such a material difficulty in precipitating of the solid complexed acetylides frequently occurs. The solution was put in the gas bubbler and crude butadiene or crude ethylene having the following compositions was fed through a rotometer to the bubbler: butadiene stream: 52% butene-1 plus isobutylene, 33% 1,3-butadiene, 0.06 to 0.11% each of methyl, ethyl and vinyl acetylenes and the rest mixed butenes and butanes; ethylene stream: 49.3% ethylene, 14.2% ethane, 0.232% acetylene and 36.3% $H_2$, $CH_4$ inerts. A gas chromatograph was used to monitor the effluent gases from the bubbler. Crude butadiene or ethylene was fed at 0.2 liters/minute and acetylene contents monitored periodically. In all of the examples except as indicated, e.g., liquid-liquid runs, room temperature and approximately atmospheric pressure were utilized. The experiment was continued until breakthrough of acetylenes above 200 p.p.m. The gas chromatograph was able to detect levels of 10 p.p.m. or above. Notations were made of whether solids precipitated during the run. In each case giving greater than 1 l./gm. capacity, solids were precipitated. Following completion of the run solution was analyzed. In the case where no solids were precipitated the spent solution was transferred and was analyzed for the following properties: pH, percent carbon, hydrogen, oxygen, copper, sulfur, infrared spectrum and programmed temperature gas chromatograph.

In some cases attempts were made to regenerate the solution for reuse by heating in the presence of a nitrogen purge gas. Both in this situation and in the following described situation where solids are precipitated both gas liquid contacting and liquid-liquid contacting are used. Where liquid-liquid contacting is used, the usual mixer followed by a settler to separate the treated solution from the solvent was used. In this case gas chromatographic readings on the effluent showed presence of regenerated acetylenes and the amount thereof.

Where solids precipitated, the solution was filtered to separate the solids. The solids were then in some cases submitted for analysis as above described and in other cases were regenerated by a variety of techniques. Included in these techniques was purging at lower temperatures, e.g., 58 to 90° C. to first remove unreacted feed materials and in other cases direct regeneration without purging was conducted utilizing an inert gas stripping agent. Again product gas analyses were obtained to determine the amount of acetylides present. A variety of regeneration techniques were used in addition to the above, including heating in the presence of a proton donor HCl, acetic acid, ammonium salts, water. Also attempts were made to heat in the absence of any proton donor, i.e., dry solids, which attempts were ineffectual.

TABLE I.—THE EFFECT OF VARIOUS SOLVENTS ON ACETYLENES REMOVAL (FROM GASEOUS $C_4$ STREAMS) CAPACITY OF CuCl SOLUTIONS (ROOM TEMPERATURE-ATMOS. PRESSURE)

| Solvent | Breakthrough (above 200 p.p.m. acetylene tail gas) Capacity, liters per gram CuCl | Solubility, gms. CuCl per 100 ml. soln. |
| --- | --- | --- |
| Dimethylsulfoxide | 12.5 | 23 |
| Diethylsulfoxide | 2.8 | 4.1 |
| Tetramethylenesulfoxide | 5.5 | 9.1 |
| N,N'-dimethylformamide | 6.8 | 1.7 |
| Ammonium hydroxide (conc.) | [1] 45 | |
| 11% DMSO in ammonium hydroxide (conc.) | [1] 12 | |
| Ethylene diamine | 7 | 2.4 |
| Diethylene triamine | 2 | 2.7 |
| Triethylene tetramine | 1.4 | |
| Diethanolamine | 0 | |
| Dimethylsulfide | 0 | 4.5 |
| Pyridine | 0 | 2.9 |
| Aniline | 0 | 3.0 |
| Acetonitrile | 0 | 0.6 |

[1] Forms explosive acetylides as a precipitate.

TABLE II.—COMPARISON OF CUPROUS SALTS FOR ACETYLENE REMOVAL (FROM $C_4$ STREAMS) CAPACITY OF CUPROUS SALT SOLUTIONS (ROOM TEMPERATURE, ATOMS. PRESSURE)

| Salt | Solvent | Breakthrough Capacity | |
| --- | --- | --- | --- |
| | | Liters/g. of Salt | Liters/g. Cu |
| CuCl | DMSO | 12.5 | 19.5 |
| $Cu_2O$ | DMSO | 0 | 0 |
| $CuCl_2$ | DMSO | 0 | 0 |
| $Cu_2O$ | Ethylenediamine | 1.5 | 1.9 |
| $Cu_2SO_3$ | DMSO | 0 | 0 |
| CuBr | DMSO | 1.0 | 2.3 |
| CAA [1] | DMSO [1] | | 10 |

[1] 50:50 mixture of DMSO and CAA solution containing 6.3 g. $Cu^+$ per 100 ml. of solution. All solutions contain approximately this same concentration of $Cu^+$.

Example 2.—The effect of dimethylsulfoxide on acetylenes removal capacity of CAA solutions (room temp., atm. pressure)

| DMSO in Solution, Vol. Percent | Breakthrough Capacity at 200 p.p.m. Acetylenes in Tail Gas | |
|---|---|---|
| | Liters/g. Cu | Liters/liter of Soln. |
| ¹ 0 | ¹ 0 | 0 |
| ² 0 | ³ 3.3 | 419 |
| 12.5 | 6.3 | 700 |
| 50 | 10 | 635 |
| 94.7 | 17 | ⁴ 114 |

¹ 50:50 mixture of CAA solution indicated below and water.
² CAA solution contains 2.49 M total Cu, 0.48 M Cupric Cu, 11.72 M $NH_3$, 6.80 M Acetate, 0.039 wt. percent polymer, and 0.004 moles per liter of acetylides.
³ Solution foams very badly only very low gas feed rates (⅓ std. rate) could be used and breakthrough to 150 p.p.m. acetylenes occurred at 1 liter/g. CuCl.
⁴ Forms a solid precipitate containing the acetylenes, other solutions stay homogeneous.

Example 3.—Effect of solids precipitation on acetylene removal from $C_4$ streams Referring to the figure (standard feed gas rate 0.2 liters/minute) it can be seen that much higher removals of acetylenes are obtained where the complexed acetylides are precipitated.

Example 4.—$C_2$ streams

| Feed (vapor, 0.2 liters/minute) | Crude Ethylene (2,300 p.p.m. acetylene) | |
|---|---|---|
| CuCl Purity, Wt. percent CuCl | ~90 | 99.5 |
| Temperature, ° C | 23 | 23 |
| Pressure, p.s.i.g | 0 | 0 |
| CuCl in DMSO, Wt. percent | 8.3 | 7.8 |
| Solution Capacity, l./g. CuCl at 200 p.p.m. acetylene in Tail Gas | 0.3 | 12.5 |
| Acetylenes in Tail Gas at 4 liters/gram CuCl of Treated Gas, p.p.m | 1,800 | <10 |

Example 5.—Liquid-liquid contacting (contacting time=1 hour)

| Feed | Crude Butadiene (3,000 p.p.m. acetylenes) | | | |
|---|---|---|---|---|
| Temperature, ° C | −15 | 24 | 38 | 65 |
| Pressure, p.s.i.g | 0 | 48 | 63 | 120 |
| DMSO Solution to Feed Ratio, Vol | 1.0 | 1.0 | 1.0 | 1.0 |
| CuCl in DMSO Solution, wt. percent | 5.4 | 5.4 | 6.4 | 6.4 |
| $H_2O$ in Solution, wt. percent | 14.6 | 0 | 1.6 | 1.6 |
| Acetylenes Content of Treated $C^4$ Product, p.p.m | <10 | <10 | 91 | 47 |
| Solid Formed During Reaction | Yes | Yes | No | No |

Example 6.—Regenerations of cuprous salt slurry with and without $N_2$ prestripping These runs include the total solution plus solids contained in a spent solution from $C_4$ treating.

| | Atmospheric Pressure Operation | |
|---|---|---|
| | Prestripped | No Prestripping |
| Stripping gas | $N_2$ | $N_2$ |
| $C_4$ From Prestripping at— | | |
| 28–58° C.: | | |
| $C_4^{--}$ in $C_4$, wt. percent | 35 | |
| Acetylenes, wt. percent | Nil | |
| Wt. percent on DMSO Sol'n | 2.9 | 0 |
| 58–110° C.: | | |
| $C_4^{--}$ in $C_4$, wt. percent | ~75 | |
| Acetylenes, wt. percent | 17 | |
| Wt. percent on DMSO Sol'n | 0.6 | 0 |
| Regeneration Temp., ° C | 110 | 110 |
| $C_4$ From Regeneration: | | |
| $C_4^{--}$ in $C_4$, wt. percent | 45 | 43 |
| Acetylenes in $C_4$, wt. percent | 45 | 9 |
| Wt. percent on DMSO Sol'n | 0.6 | 4.1 |

Example 7.—Regeneration of cuprous salt solution with and without prestripping (no solids in spent solution)

| | Prestripped at 90° C. | No Prestripping |
|---|---|---|
| Stripping gas | $N_2$ | $N_2$ |
| $C_4$ From Prestripping: | | |
| $C_4^{--}$ in $C_4$, wt. percent | ~35 | |
| Acetylenes, wt. percent | 0.24 | |
| Regeneration Temp., ° C | 105 | 110 |
| $C_4$ From Regeneration: | | |
| $C_4^{--}$ in $C_4$, wt. percent | ~50 | 43 |
| Acetylenes, wt. percent | 38 | 9 |

Example 8.—Regeneration restores solution treating capacity

A series of runs was made on crude butadiene using a solution of 5.9 wt. percent cuprous chloride in dimethyl sulfoxide with regeneration after each cycle by stripping with $N_2$ at 110° C. to 150° C.

| | Solution Treating Capacity, l./g. CuCl at 200 p.p.m. acetylenes in product | |
|---|---|---|
| | No Solids Made | Solids Made |
| Cycle 1 | 3.5 | 16.7 |
| Cycle 2 | 4.9 | 7.5 |
| Cycle 3 | 3.5 | 4.3 |

This series of runs shows that a considerable portion of the capacity of the solution is restored by regeneration at 110 to 150° C. with $N_2$ stripping. The loss in capacity is due to loss of proton acceptor.

Example 9.—Proton donors inhibit reaction to remove acetylenes

The standard capacity test was run on CuCl-DMSO solutions to which small amounts of proton donors, sufficient to lower the pH below 7, e.g., HCl and $NH_4Cl$ had been added. In both these cases no acetylenes removal was obtained. A similar test with acetic acid shows that it is too weak a proton donor to inhibit the reaction at 20 to 40° C.

Example 10.—Proton acceptors enhance reaction to remove acetylenes

Because the formation of HCl in the acetylene removal reaction which tends to limit the capacity of CuCl-DMSO solutions for acetylenes, proton acceptors which tie up the HCl can extend the capacity of the solution. The addition of a limited amount of anhydrous ammonia to a CuCl-DMSO solution extended its capacity from the usual 10–17 liters/gram CuCl up to 22 liters/gram CuCl. Furthermore, the addition of small amounts of NaOH or air to spent CuCl-DMSO solutions reactivated the solutions and gave further acetylenes removal. The NaOH apparently ties up the HCl as NaCl while the air oxidizes it to water and $CuCl_2$ in the presence of the DMSO-CuCl solution. Preferably the amount of proton acceptors added is such to keep the pH within the preferred ranges listed above.

Example 11.—Proton donors needed during regeneration

Experiments on the regeneration of dry solids obtained by washing the solids (filtered from spent CuCl-DMSO solutions used to treat crude $C_4$=) successively with water, alcohol, and ether and then drying in flowing $N_2$ have shown the high desirability of having a proton donor available to enhance recovery of acetylenes from the solids. Proton donors which have proved satisfactory at room temperatures are dilute and concentrated aqueous HCl and anhydrous HCl in DMSO solution. When heated to 100 to 150° C., the acetylenes can be recovered from the solids by using water, steam, water-DMSO solution, $NH_4Cl$ solution, ammonium acetate solution, and $NH_4OH$ solution. Care must be taken to purge the acetylenes from the solids and solutions rapidly or they may polymerize, react with the proton donor, or reduce CuCl to Cu metal. However, by treating the solids free of unreacted feed with proton donors, acetylene purities in the recovered acetylenes greater than 95% have been obtained.

Example 12.—Acetylene removal from synthetic feeds

Synthetic feed stocks were made by adding about 1% of a pure acetylene to a mixture of 65% isobutylene and 34% of 1,3-butadiene. Separate mixtures were made using methylacetylene, ethyl acetylene and vinyl acetylene as the pure acetylene. In each case the synthetic feed was bubbled through a CuCl-DMSO solution at room temperature until the solution was exhausted. In each case a solid precipitate formed and the acetylenes content of the tail gas was less than 25 p.p.m. The precipitates were colored dark tan for ethyl acetylene, yellow green for methyl acetylene and bright yellow for vinyl acetylene. They were non-explosive on heating. This shows that either pure acetylenes or mixtures of acetylenes are removed equally well by CuCl-DMSO solutions.

Example 13.—Solubility of complexed complex acetylide prepared from vinyl acetylene in various solvents other than sulfoxides which show immediate precipitation Saturated solutions containing an excess of the complexed complex acetylide of cuprous chloride with vinyl acetylene were prepared at room temperature using various solvents. The solutions were then filtered, evaporated to dryness, and concentrated sulfuric acid was added to the dry solid residue. The samples were then re-evaporated to dryness and fired to recover CuO. The amount of complexed complex acetylide in the saturated solution was calculated from the wt. of CuO obtained.

| Solvent: | Solubility of complexed complex acetylide, gms. per 100 ml. of solution |
|---|---|
| Dimethylformamide | 0.073 |
| Dimethylsulfide | 0.17 |
| Diethylsulfide | 0.30 |
| Acetonitrile | 0.14 |
| Ethylenediamine | 0.63 |
| Diethylenetriamine | 0.40 |
| Triethylenetetramine | 0.38 |
| Aniline | 0.17 |
| Pyridine | [1] 1.13 |

[1] Solution may not have been saturated.

It is noted that the above-data indicates that low solubility correlates with high capacity except in the instance where the cuprous salt had low solubility in the solvent, where cuprous salt reacted with solvent, e.g., aniline, and where the pH was too acidic, e.g., dimethylsulfide (pH 4.4) and diethylsulfide (pH 2.7).

What is claimed is:

1. 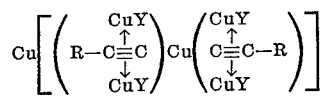

where:

CuY is a cuprous salt selected from the groups consisting of cuprous halides, cuprous salts of $C_1$ to $C_4$ monocarboxylic acids, cuprous ammonium salts of $C_1$ to $C_4$ monocarboxylic acids, and cuprous hydroxide each R is a radical selected from the group consisting of H, $C_1$ to $C_{11}$ alkyl groups and $C_2$ to $C_{11}$ alkenyl groups.

2. The compound of claim 1 in which CuY is cuprous chloride.

3. The compound of claim 2 in which each R is H.

4. The compound of claim 2 in which each R is a methyl group.

5. The compound of claim 2 in which each R is an ethyl group.

6. The compound of claim 2 in which each R is a vinyl group.

7. The compound of claim 2 in which one R is an ethyl group and the other R is a vinyl group.

8. The compound of claim 2 in which an amine-cuprous salt complex is cocrystallized with the compound.

References Cited

UNITED STATES PATENTS

| 2,370,809 | 3/1945 | Morrell et al. | 260—438.1 XR |
| 2,441,400 | 5/1948 | Doumani et al. | 260—438.1 |
| 2,444,945 | 7/1948 | Morrell | 260—438.1 XR |
| 2,467,845 | 4/1949 | Morrell et al. | 260—438.1 |

OTHER REFERENCES

Bailar: The Chemistry of the Coordination Compounds, Reinhold Publ. Corp., New York (1956), p. 495.

TOBIAS E. LEVOW, Primary Examiner.

H. M. SNEED, Assistant Examiner.

U.S. Cl. X.R.

260—679